United States Patent
Jiang et al.

(10) Patent No.: US 7,203,005 B2
(45) Date of Patent: Apr. 10, 2007

(54) REAL IMAGE CONFIGURATION FOR A HIGH EFFICIENCY HEADS-UP DISPLAY (HUD) USING A POLARIZING MIRROR AND A POLARIZATION PRESERVING SCREEN

(75) Inventors: Yingqiu Jiang, Sunnyvale, CA (US); Aharon Hochbaum, Berkeley, CA (US)

(73) Assignee: Chelix Technologies, Inc., Sunnyvale, CA (US)

( * ) Notice: Subject to any disclaimer, the term of this patent is extended or adjusted under 35 U.S.C. 154(b) by 475 days.

(21) Appl. No.: 10/443,454

(22) Filed: May 22, 2003

(65) Prior Publication Data

US 2004/0008412 A1    Jan. 15, 2004

Related U.S. Application Data

(60) Provisional application No. 60/382,872, filed on May 22, 2002.

(51) Int. Cl.
*G02B 27/14* (2006.01)

(52) U.S. Cl. .................. 359/630; 359/13; 359/636; 345/7

(58) Field of Classification Search .................. 359/13, 359/630, 634, 629, 636, 641; 345/7–9; 349/11
See application file for complete search history.

(56) References Cited

U.S. PATENT DOCUMENTS 4,900,133 A * 2/1990 Berman ........................ 349/11

* cited by examiner

*Primary Examiner*—Huy Mai
(74) *Attorney, Agent, or Firm*—Ralph J. Crispino

(57) ABSTRACT

An image display system includes a polarized image projection device, a polarization preserving transmissive diffusiver, and a polarizing reflector element as a non-blocking mirror (referred to as a "combiner"). The combination of a polarization preserving transmissive diffuser or rear projection screen and a polarizing reflector results in a high brightness HUD for applications including automotive, aerospace, or other applications where HUD systems are used. The system also maintains the low haze and high transmittance of the windshield that will meet the requirement of standards of windshields for motor vehicles and similar applications.

17 Claims, 1 Drawing Sheet

REAL IMAGE CONFIGURATION FOR A HIGH EFFICIENCY HEADS-UP DISPLAY (HUD) USING A POLARIZING MIRROR AND A POLARIZATION PRESERVING SCREEN

RELATED APPLICATIONS

The present application claims priority to U.S. Provisional Patent Application Ser. No. 60/382,872 filed May 22, 2002 entitled "Real Image Configuration for a High Efficiency Heads-Up Display (HUD) Using a Polarizing Mirror", which is incorporated by reference herein.

BACKGROUND OF THE INVENTION

1. Field of the Invention

The present invention generally relates to heads-up display devices, and more particularly to a display using a real image projection system and a polarizing reflector element as a non-blocking mirror in heads-up display systems.

2. Background Information

Helmet mounted displays and windshield mounted displays (hereafter referred to as heads-up displays or HUDs) are increasing in importance in both military and civilian environments. For example, in a military setting, a heads-up display presents valuable information to pilots by superposing virtual images of data information over the pilots' normal field of vision usually focused at infinity. The flight parameters of the aircraft, navigational displays or any other relevant information may be viewed without the pilot moving his/her head or changing the focusing distance, thereby generally improving flight performance and safety. HUDs are also finding wider usage in civilian transportation, with windshield displays becoming popular in many automobiles. Further, HUDs are beginning to find a wide range of application in the entertainment markets, such as in videos, video games, and virtual reality. As used herein, the term "HUD" shall refer to a display which superimposes visual information (usually data, but may also be natural scenes) on the normal ambient scene.

Current information or image providing systems not based on HUD require drivers to steer their eyes away from the primary scene (e.g., highway) in order to read the information positioned away from the windshield. This mode of operation is highly unsafe. Using a HUD is inherently safer since the driver can keep looking forward and read the information simultaneously. This advantage was recognized, for example, in airplanes where a pilot, in certain circumstances cannot afford not to look forward. However, current devices suffer low light efficiency. For vehicular applications HUD systems are also required to be inherently compact and have high brightness. Another critical requirement of automotive HUD systems is low cost, and hence cannot use the same expensive parts as in airplanes.

The fundamental operation of HUDs is based on known projection of an image onto a reflective surface also known in general as a "combiner". For example, Berman U.S. Pat. No. 4,900,133 describes an HUD system whereby a CRT or LCD is used to generate an image to be displayed, and a circular polarizing filter is used as combiner to direct light having a bandwidth in the reflective range of the combiner toward the viewers' eyes. Berman described one example whereby both left handed and right handed polarized light are directed to the combiner, and another whereby only one handedness is directed to the combiner. In the embodiment whereby both left handed and right handed polarized light are directed to the combiner, a limitation exists in that ambient light from outside in the selected bandwidth of is essentially blocked. In the embodiment where one handedness is used and a CRT display is provided, a polarizer is used to filter out the non-selected handedness. This results in low light efficiency, since the polarizing filter reduces at least 50% of the light. Further, where LCD displays are used, thermal management becomes a problem.

In another system, described by MicroVision (e.g., see http://www.mvis.com/prod_auto_hud.htm_and http://www-.mvis.com/pdfs/sid_auto.pdf), a blocking screen is used to project an image at a lower portion of the windshield, thus prohibiting the driver to see through the blocking portion from inside of the car. This system is lacking in that the driver may not view ambient conditions simultaneously with the image display.

In still a further system proposed by MicroVision, a laser scanner is used as the image source. The laser scanner (e.g., under the dashboard) outputs polarized light. The polarized light within a characteristic bandwidth is directly reflected from a polarizing reflector to the user's line of sight. However, such a system results in an image that appears to float in front of the driver, as opposed to being viewable at the windshield itself. The display is directly imaged onto viewer's retina, which causes discomfort and strict positioning of driver's head.

Thus, known HUD systems lack high light efficiency, haze-free operation, high transmissivity (of ambient light) and high reflectivity (of information image) projection system for HUD applications. Accordingly, a need exists for a simple and inexpensive image generating system for use within a HUD systems that provides a bright image display and minimizes or eliminates detriments associated with the blocking or partial blocking of ambient view.

SUMMARY OF THE INVENTION

The above-discussed and other problems and deficiencies of the prior art are overcome or alleviated by the several methods and apparatus of the present invention for displaying an image in a user's line of sight. An image display system includes a polarized image projection device, a polarization preserving transmissive diffusiver, and a polarizing reflector element as a non-blocking mirror (referred to as a "combiner").

The combination of a polarization preserving transmissive diffuser or rear projection screen and a polarizing reflector (e.g., a cholesteric reflector, a DBEF™ reflector, or inorganic chiral film made of stacks of thin films) results in a high brightness HUD for applications including automotive, aerospace, or other applications where HUD systems are used. The system also maintains the low haze and high transmittance of the windshield that will meet the requirement of standards of windshields for motor vehicles and similar applications (see, for example the standards as defined in http://www.unece.org/trans/main/wp29/wp29regs. html).

The polarization preserving transmissive diffuser is used as a real image rear projection screen at the dashboard level. The real image at the dashboard plane is reflected towards the driver by a wavelength selective polarizing reflector that is positions at the windshield. The use of a scanner, real image rear projection screen and a wavelength selective polarized reflector can reduce significantly the cost of such systems as compared to conventional systems described above.

Since the laser scanner narrowband light is highly polarized, most of it will be reflected by the polarizing reflector towards the driver delivering a bright image. However, due to the wavelength selectivity and the polarization property of the reflector, ½ of the ambient light (one polarization component) plus all the light of the opposite polarization which is outside the reflection bands will also be transmitted, thus realizing high transmittance. The driver will see an image that is projected behind the polarization preserving rear projection screen redirected by a reflection from the polarizing reflector on the windshield.

The above-discussed and other features and advantages of the present invention will be appreciated and understood by those skilled in the art from the following detailed description and drawings.

DETAILED DESCRIPTION OF THE ILLUSTRATIVE EMBODIMENTS

Figure 1:
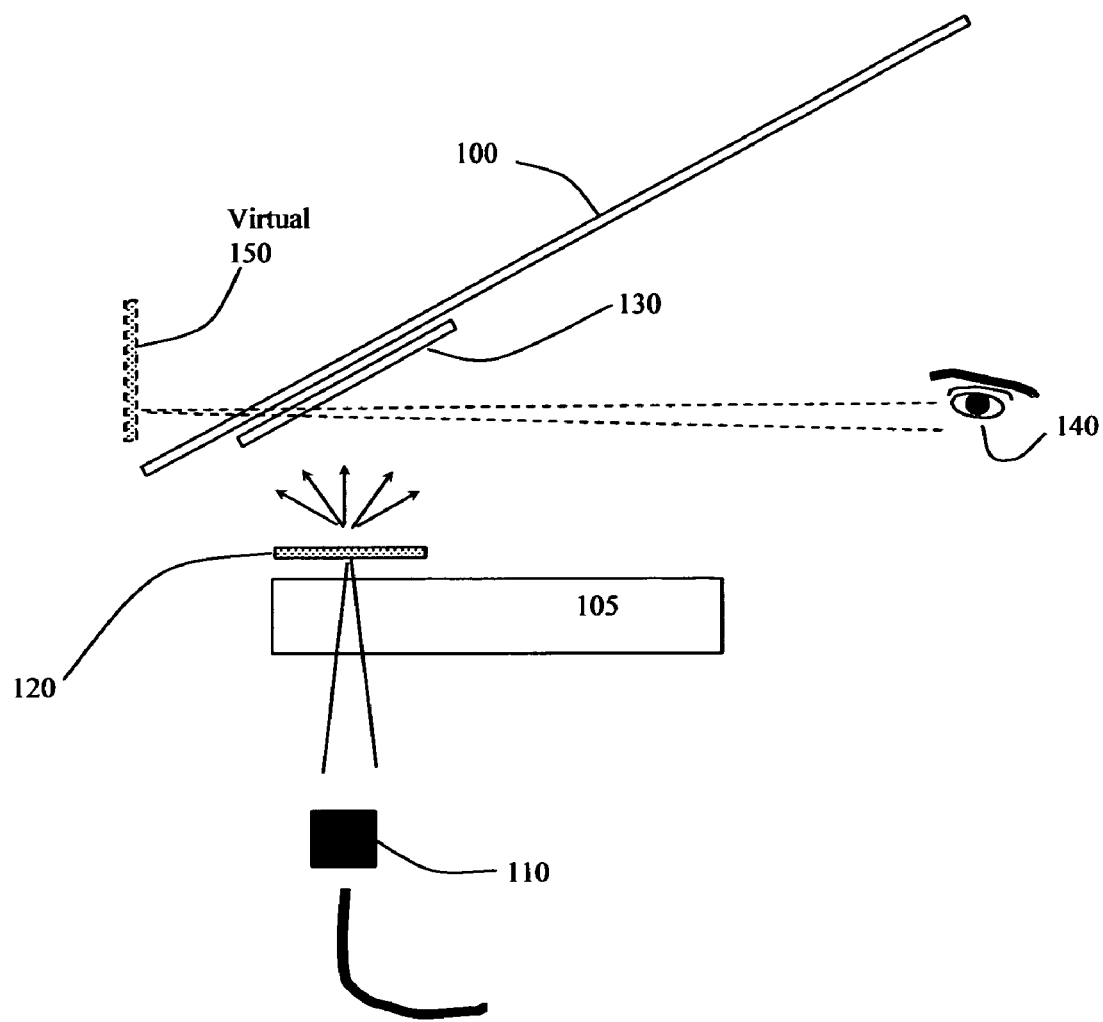
FIG. 1 is a schematic representation of a HUD of the present invention.

Referring to FIG. 1, A HUD system 100 includes three primary components: a polarized image generating system 110; a polarization preserving rear projection screen 120; and a polarizing reflector 130 on a windshield 100. The viewer 140 generally views the display in a virtual image plane 150.

The image generating system 110 projects a polarized real image on the polarization preserving screen 120. Since in typical HUD applications the information image is superimposed on a bright background, and a very bright image is required for the information to be readable, preferred embodiments for the image generating system include laser sources, in particular bright laser diode sources. The image is formed by well known scanning mechanisms over the screen.

The laser scanner system 110 projects images through the polarization preserving screen 120, creating a "real" image on the screen 120 positioned, e.g., on the dashboard 105 (as opposed to a reflected "virtual" image). Light from the laser scanner may be mostly linearly polarized. The polarization preserving rear projection screen 120 transmits and diffuses the laser light, without undue reflection, into a prescribed solid angle. This solid angle, in HUD systems, may also be referred to as the "eye box", which compensates the expected eye position of most viewers including head tilting and turning. This angle may vary, e.g., up to about ±30°, preferably up to about ±10°, around the average direction of transmission from the polarization preserving screen.

Thus, the polarization preserving screen 120 creates a real image that can be seen within a certain solid angle around the average line of sight. The light diffusion is achieved without significant depolarization of the light. Such functionality may be imparted by any known polarization preserving diffuser. Any diffuser (e.g., holographic diffusing screens, ground glass, opal glass, opaque plastics, chemically etched plastics, machined plastics) that is formed and designed to preserve the polarization may be suitable. For example, holographic diffusing screens may be employed. One provider of such holographic diffusing screens, or holographic light shaping diffusers®, is Physical Optics Corporation of Torrance, Calif. Such diffusers include non-periodic randomly positioned surface-relief microstructures to homogenize otherwise nonuniform light sources, without altering the polarization of the light. An example of a diffuser used in the present invention is the LSD holographic diffuser-LSD20AC30-6.

Other polarization-preserving diffusers may be used, generally comprising particles dispersed within a binder. The type of particles used and the manner in which they are dispersed in the binder each have an effect on the polarization-preserving characteristic of the diffuser. To provide effective polarization preservation, the particles should generally be spherical, the diffuser should be thin, and that the particle loading in the binder should be low. Diffuser thickness and particle loading also may be adjusted to vary the gain and/or viewing angle of the diffuser.

Another suitable supplier of certain polarization preserving diffusers is Microsharp Corporation Limited, Swindon, United Kingdom.

Other components suitable as polarization preserving diffusers include micro-lens arrays and many other micro optical elements usually made of micro-optical elements replicated on plastics. With the continuing enhancement of lithographic processes, and borrowing of technology from semiconductor processing, such micro-lens arrays and other micro optical elements will benefit, and may be used so long as the polarization preservation effect remains.

The diffusers may be formed of any substantially optically clear material, including but not limited to glass, sol-gel glass, quartz glass, polycarbonate, acrylic plastics, polyesters, epoxies, and any other suitable material.

In certain embodiments, it is desirable to add a quarter-wave phase retarder at the scanner output or the lasers' output to transform the polarization state from linear polarization into circular polarization. One desirable result of utilizing circularly polarized light is the minimization of requirements to maintain a strict alignment of the scanner polarization direction with respect to the direction of the polarizing reflector.

Since quarter-wave elements are usually tuned only to one wavelength. Thus, for example, if the quarter-wave element is tuned to the green light, only this wavelength will transform completely from linear to circular polarization. In the example, blue and red light will also be transformed, but not completely, as the output from the quarter-wave element will contain for example a major left-handed component and a small right-hand component in the blue and red. This can be avoided by using broadband quarter-wave element or by fitting each laser source with its own tuned quarter-wave element.

The polarizing reflector 130 (also referred to as a polarizing mirror or combiner) is an optical element that reflects one polarization of the light (e.g. one mode of linearly polarized light or one handedness of circularly polarized light) within a certain band of wavelengths for display to the viewer 140, while transmitting the wavelengths between the bands as well as all wavelengths of light of the opposite polarization mode. The reflection bands of the polarizing reflector can be selected to reflect essentially all the narrow-band light from the lasers thus creating the brightest possible image. At the same time the transmission of ambient light can be higher than 75%. Preferred types of combiners 130 include cholesteric liquid crystal (CLC) elements. Important properties of CLC elements used herein include substantial transparency to all wavelengths of electromagnetic radiation, specifically visible light, except within a narrow bandwidth around a selected primary wavelength (the reflectivity band), for example 540 nanometers (i.e., green). Within that bandwidth, light of one rotary sense (left handed circularly polarized or right handed circularly polarized) incident upon the cholesteric element from either direction is reflected by the CLC element, and light of the opposite sense either is transmitted through the CLC element (except for light within the reflectivity band). Light reflected from the CLC element maintains its rotary sense.

Other suitable material for the combiner 130, where circular polarized light is diffused from the polarization preserving screen 120, include inorganic chiral films formed from stacks of thin solid films. Inorganic chiral films posses many advantages in particular for vehicular HUD implementations, including their low birefringence, allowing for very narrow reflection bands, thus increasing the ambient transmission of such polarizing reflectors. Further, since inorganic chiral films are formed of solid films, they can withstand extreme environmental conditions such as high temperatures, high humidity levels, harsh UV and exposure to other radiations. Additionally, inorganic chiral films provide mechanical resilience, scratch and chemical resistance and in general provide long service period.

In embodiments whereby linearly polarized light is diffused form the polarization preserving screen 120, dual brightness enhancing films (e.g., Vikuiti™ DBEF available from Minnesota Mining and Manufacturing, St. Paul, Minn.) may be used as a transmissive linear polarization reflector. However, since the ability to provide narrowband reflection (since known dual brightness enhancing films are broadband) is limited in such films, typically 50% ambient transmission is achieved (the opposite polarization state than that reflected).

Having thus described the components of the HUD system, operation thereof will now be described. A polarized real image is generated by the laser scanner 110 on the polarization-preserving rear projection screen 120 as shown in FIG. 1. Note that the scanner may project a monochrome image or three beams simultaneously (e.g. red, green and blue colors) to create a polarized colored real image. This screen provides a real image plane (or an object plane) for the polarizing reflector. Where three beams are used, a broadband reflective polarizer 130 may be used, or a laminate of three polarizers, tuned to red, green and blue, may be used to form the reflective polarizer 130.

Since laser beams are generally highly linearly polarized, the beams may be transformed into circularly polarized light before entering the rear projection screen 120 as described above, e.g., with a quarter wave element. This rear projection screen 120 generates an image plane while preserving to a large degree the circular polarization of the beams. The polarizing reflector, which is positioned at the windshield, is a film that ideally reflects 100% of the corresponding handedness of the circularly polarized light only within the tuned narrow bands centered around the wavelength(s) of the laser(s). Together with the polarizing reflector 130, the polarization preserving qualities of the rear projection screen 120 assures that most of the laser light will be reflected towards the observer and thus leading to a perceived bright image. This is particularly important for vehicles where the image is viewed on a bright background.

Since in this system the rear projection screen 120 is not positioned at the windshield (in the example FIG. 1, the real image screen is positioned on the dashboard) it does not interfere with the clarity and the transmission of the windshield. Only the polarizing reflector 130 is positioned at the windshield. The polarizing reflector 130 may be embedded between two glass plates comprising the windshield, permanently adhered to the inside of the windshield or removably adhered to the inside of the windshield (such that it can be removed and reattached at will). Since the ambient light is unpolarized and the polarizing reflector reflects only one polarization, at least 50% of all ambient light will be transmitted. For example, if the polarizing reflector reflects a left-handed circular polarization it will transmit all of the right-hand polarization component (50%) of the ambient light. In addition, the polarizing reflector can be designed to reflect only left-handed polarized light in the near vicinity of the laser wavelengths. This feature does not compromise the image brightness and at the same time allows a significant portion of the left-handed ambient light also to be transmitted. Assume, for example, that the combined width of the three reflection bands of the polarizing reflector amount to about half of the visible range. Thus, 50% of the left-handed component of the ambient light will also be transmitted. Thus the total transmission of ambient light in this example is 75%. Preferably, at least 50% of total ambient light will be transmitted, and more preferably at least 50% of total ambient light will be transmitted.

Note that a significantly higher portion will be transmitted for a monochrome image since only one reflection band will be employed (e.g., greater than 90% ambient transmission may be achieved). Also note that the selective wavelength reflection by the polarizing reflector 130 will cause the transmission through it to be slightly tinted. If a non-selective (broadband) polarizing reflector is used the total ambient transmission will be limited to 50%.

While the preferred implementation employs circularly polarized light, linearly polarized light may be used in a similar scheme. In the latter case the polarization direction after the screen has to be maintained substantially at a fixed relation to the polarization reflection direction of the polarizing mirror at the windshield. This requirement applies only for schemes based on linear polarization and required alignment of the scanner and the windshield. In an automotive applications, a proper alignment between the scanner and the windshield (where the polarizing reflector is attached) should be achieved on the vehicle production line and be maintained during the service life of the vehicle. In the circular polarization scheme the relative orientation of the scanner compared to the windshield is not important.

On the other hand, in the circular polarization scheme there is a need to keep a fixed alignment between the laser linear polarization direction and the fast axis of the quarter-wave plate that is used to transform the polarization from linear into a circular. This, however, can be done within the scanner itself (in one optical housing) during the high precision production of the scanner. Therefore, creating the proper alignment and maintaining it during the service life of the scanner would be easier and less costly to achieve.

One of the primary benefits of the present invention is the reduction of haze. Preferably, haze (measured by integrated sphere measurement as known by those skilled in the art) is less than about 5%, preferably less than about 3%, most preferably less than about 1%.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An image display system for displaying an image in a user's line of sight, the image display system comprising:
   a polarized real image projection device including polarized image scanning optics and a polarization preserving diffuser; and
   a polarizing reflector element as a non-blocking mirror.

2. The image display system as in claim 1, wherein the polarized image scanning optics comprises at least one laser diode that outputs polarized light.

3. The image display system as in claim 1, wherein the image projection device projects linearly polarized light and the polarizing reflector reflects primarily only the same polarization as the linearly polarized light.

4. The image display system as in claim 3, wherein the polarizing reflector comprises a multi-layer reflector.

5. The image display system as in claim 1, wherein the image projection device projects circularly polarized light of a certain handedness and the polarizing reflector reflects primarily only the same handedness as the circularly polarized light.

6. The image display system as in claim 5, wherein the polarizing reflector comprises a cholesteric reflector.

7. The image display system as in claim 5, wherein the polarizing reflector comprises an inorganic chiral film reflector.

8. The image display system as in claim 1, wherein the polarization preserving diffuser is a holographic diffusing screen.

9. The image display system as in claim 1, wherein the polarization preserving diffuser is a microlens array.

10. The image display system as in claim 1, wherein the polarization preserving diffuser comprises a film formed of particles dispersed within a binder.

11. A windshield including the image display system as in claim 1, wherein the haze in a region of the windshield having the polarizing reflector is less than 5%.

12. A windshield including the image display system as in claim 1, wherein the haze in a region of the windshield having the polarizing reflector is less 3%.

13. A windshield including the image display system as in claim 1, wherein the haze in a region of the windshield having the polarizing reflector is less than 1%.

14. A windshield including the image display system as in claim 1, wherein the transmittance in a region of the windshield having the polarizing reflector is greater than 50%.

15. A windshield including the image display system as in claim 1, wherein the transmittance in a region of the windshield having the polarizing reflector is greater than 75%.

16. The image display system as in claim 1, further comprising a quarter wave element between the polarized image scanning optics and the polarization preserving diffuser thereby converting linearly polarized light output from the image scanning optics to circularly polarized light of a certain handedness, wherein the a polarizing reflector reflects primarily only the same handedness as the circularly polarized light.

17. A method of displaying an image in a user's line of sight of an ambient view comprising:

projecting a polarized real image to a polarizing reflector, the polarizing reflector reflecting the image for display by the user while allowing transmission of all opposite polarization light or same polarization light of wavelengths outside the reflection bands from the ambient view, wherein the polarized image is projected from image scanning optics to a polarization preserving diffuser creating a real image on the polarization preserving diffuser.

* * * * *